United States Patent [19]

Lu

[11] Patent Number: 5,713,672
[45] Date of Patent: Feb. 3, 1998

[54] POSITIONING PIVOT

[76] Inventor: Sheng-nan Lu, No. 174, Chunying St, Taipei Hsien, Taiwan

[21] Appl. No.: 744,651

[22] Filed: Nov. 6, 1996

[51] Int. Cl.$^6$ .................................................. F16C 17/02
[52] U.S. Cl. ..................... 384/289; 384/292; 384/296; 384/396; 384/906
[58] Field of Search .................... 384/289, 292, 384/296, 396, 906, 416

[56] References Cited

U.S. PATENT DOCUMENTS

| 3,428,345 | 2/1969 | Ryszewski | 384/396 |
| 4,840,498 | 6/1989 | Lichtfuss | 384/906 |
| 4,983,050 | 1/1989 | Aida | 384/906 |
| 5,536,090 | 7/1996 | Nisley | 384/906 |

*Primary Examiner*—Lenard A. Footland
*Attorney, Agent, or Firm*—Welsh & Katz, Ltd.

[57] ABSTRACT

A positioning pivot including a shaft, at least one sleeve and at least one hinge butt is able to prolong its lifespan by inserting the sleeve between the shaft and the hinge butt after a combination of the shaft and the hinge butt is accomplished. Due to an opposite difference between an orientation of a helical slit defined in the sleeve and a helical groove defined in an outer periphery of the shaft, lubricant added to the helical groove is able to be disperse to other portions of the shaft when the sleeve is securely retained within the hinge butt and the shaft is rotated. Additionally, a portion of the shaft is configured to be hollow, so that even when a relationship between the portion and the sleeve is loosened, a dimension of the portion of the shaft is able to be enlarged by an adjusting element to regain tight relationship between the portion of the shaft and the sleeve again.

7 Claims, 3 Drawing Sheets

5,713,672

POSITIONING PIVOT

FIELD OF THE INVENTION

The present invention generally relates to a positioning pivot, and more particularly to a positioning pivot which is able to reduce a friction effect caused by a rotation by means of a plurality of sleeves securely received within a collar of the positioning pivot.

BACKGROUND OF THE INVENTION

Positioning pivots are commonly used in many casing structures such as a notebook computer. FIG. 6 illustrates a conventional positioning pivot in perspective view used in any pivotable casing structure. The conventional positioning pivot comprises a shaft 60 having a first portion 61 with at least one through hole 62 defined therein and a second portion 63 with a helical groove 64 defined in an outer periphery thereof, a hinge butt 70 including at least one collar 71 and an extension 72 integrally formed therewith. The extension 72 of the hinge butt 70 further has at least one second through hole 73 defined therein. The second portion 63 of the shaft 60 is rotatably received within the collar 71 of the hinge butt 70, after the first through hole 62 is securely connected to an object, such as a screen (not shown), and the second through hole 73 of the extension 72 is securely connected to a computer (not shown). The positioning pivot of this type can indeed provide a pivot effect to the objects which the positioning pivot connects with. Yet, a friction effect between the second portion 63 of the shaft 60 and the collar 71 will gradually enlarge a gap (not shown) therebetween and thus causes a loose connection.

In order to mitigate the above mentioned problem, a helical lubrication groove 64 is defined in an outer periphery of the second portion 63 of the shaft 60 and lubricant (not shown) is emitted from the lubrication groove 64 to the periphery of the second portion 63. Therefore, the friction between the second portion 63 of the shaft 60 and the collar 71 of the hinge butt 70 is greatly reduced after the second portion 63 is inserted into the collar 71.

Nevertheless, the lubricant added onto the periphery of the second portion 63 of the shaft 60 can only lubricate a partial portion thereof due to the rotation between the collar 71 and the second portion 63 is limited within a certain range of angle.

From the previous description, it is noted that a positioning pivot as described above is unable to fulfill the practical requirements when it is used to connect with objects.

Thus, a positioning pivot constructed in accordance with the present invention tends to mitigate and/or obviate the aforementioned problems.

SUMMARY OF THE INVENTION

The main objective of the invention is to provide a positioning pivot which is able to expand the lubrication effect between inner parts thereof and is thus prolong its lifespan. The positioning pivot of the invention includes a shaft 10 having a first portion 11 with at least one through hole 111 defined therein and a second portion 12 having a helical groove 121 defined in on an outer periphery thereof, at least one sleeve 20 having at least one protrusion 22 formed on an outer peripheral wall thereof and a helical slit 23 defined therein, and a hinge butt 30 having at least one collar 31 and an extension 32 integrally formed therewith. The helical slit 23 of the sleeve 20 is oriented oppositely to the orientation of the helical groove 121 of the second portion 12 of the shaft 10, such that lubricant added in the helical groove 121 of the second portion 12 is able to be dispersed to a larger portion therearound when the shaft 10 is rotated manually by a user, after the sleeve 20 is inserted into the hinge butt 30 and securely retained therein and the second portion 12 of the shaft 10 is inserted into the sleeve 20 and resulted that there will be no movement between the collar and the second portion of the shaft.

Another objective of the invention is to provide a positioning pivot including a shaft having a first portion and a second hollow portion, at least one sleeve having at least one protrusion formed on an outer peripheral wall thereof and a helical slit defined in the outer peripheral wall, and a hinge butt having at least one collar and an extension integrally formed therewith. A dimension of the hollow second portion of the shaft is able to be enlarged by inserting an adjusting means therein, so that even when the connection between the inner parts becomes loose, the enlargement of the dimension of the second portion is able to be supplemented to the loss of the friction between the inner parts after usage over a long period of time.

Other objects, advantages and novel features of the invention will become more apparent from the following detailed description when taken in conjunction with the accompanying drawings.

BRIEF DESCRIPTION OF THE DRAWINGS

The present invention will now be better understood with reference to the following drawings, wherein.

DETAILED DESCRIPTION OF THE PREFERRED EMBODIMENT

Figure 1:
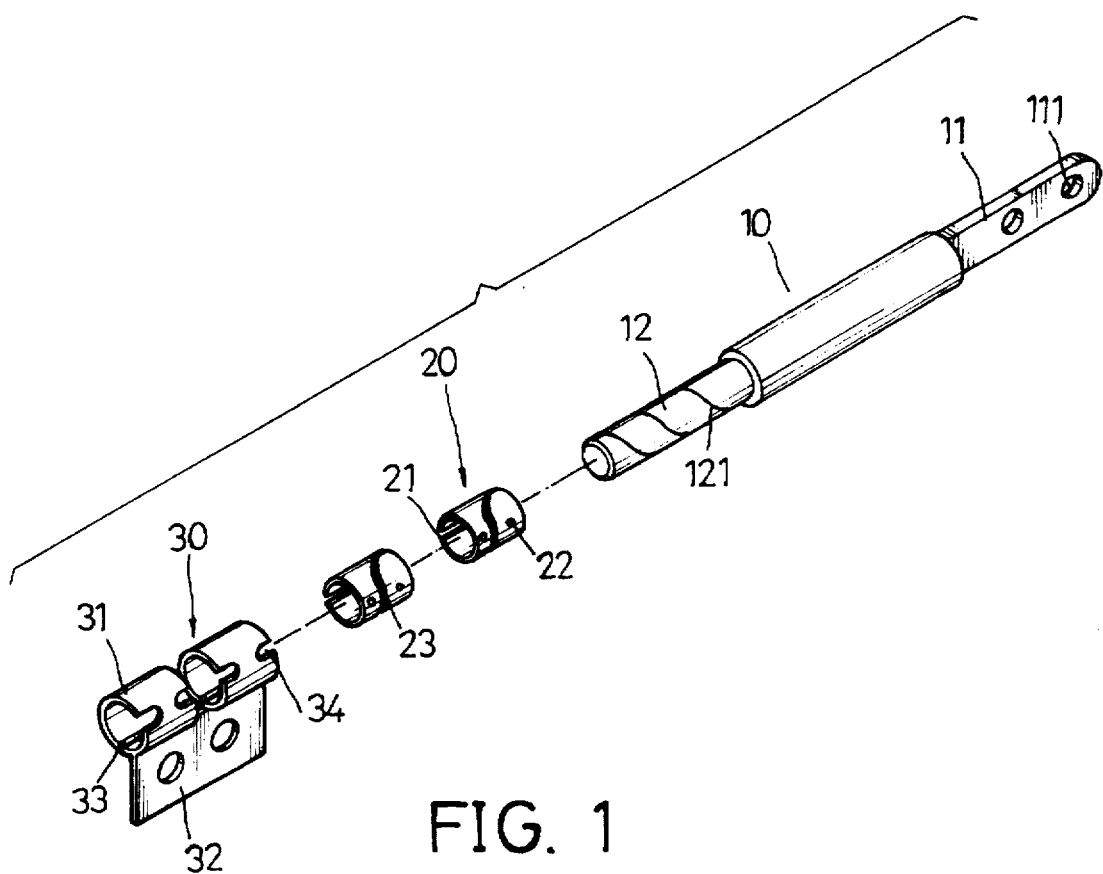
FIG. 1 is an exploded view of a positioning pivot constructed in accordance with the present invention.

Referring to FIG. 1, a positioning pivot constructed in accordance with the present invention is shown. The positioning pivot includes a shaft 10 having a first portion 11 with at least one through hole 111 defined therein and a second portion 12 having a helical groove 121 defined in an outer periphery thereof, at least one sleeve 20 (two are shown in this embodiment) having at least one protrusion 22 formed on an outer peripheral wall thereof and a helical slit 23 defined also in the outer peripheral wall thereof, and a hinge butt 30 having at least one collar 31 with at least one notch 34 defined in an end face thereof and an extension 32 integrally formed therewith. The helical slit 23 of the sleeve 20 is oriented oppositely to the orientation of the helical groove 121 of the second portion 12 of the shaft 10, such that lubricant added in the helical groove 121 of the second portion 12 is able to be dispersed to a larger portion therearound when the shaft 10 and the hinge butt 30 are mounted respectively to objects, such as a screen and a computer (not shown) and the combination of the second portion 12 of the shaft 10 is inserted into the collar 31 and the sleeve 20 is inserted therebetween is accomplished.

Figure 2:
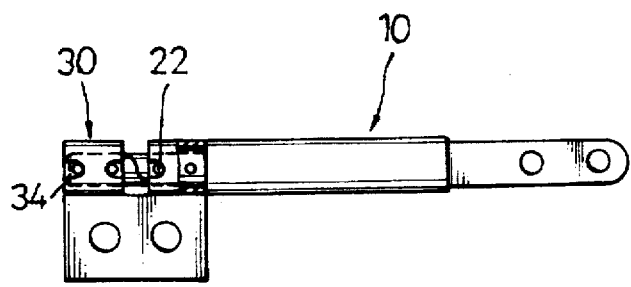
FIG. 2 is a side view of the positioning pivot.

For a better view of a structure of the sleeve 20 inserted into the collar 31, FIG. 2 shows that after the sleeve 20 is inserted into the collar 31 and the second portion 12 of the shaft 10 is inserted into the sleeve 20, the protrusion 22 of the sleeve 20 is securely received within the notch 34. Thus, when the shaft 10 is rotated manually, due to the retainment of the protrusion 22 of the sleeve 20 by the notch 34 of the collar 31, there will be no movement between the collar 31 and the second portion 12 of the shaft 10, thereby the orientation of the helical groove and the helical slit and the friction effect between the sleeve 20 and the second portion 12 of the shaft 10 will therefore disperse the lubricant oil to a larger portion around the second portion 12 of the shaft 10.

Figure 3:
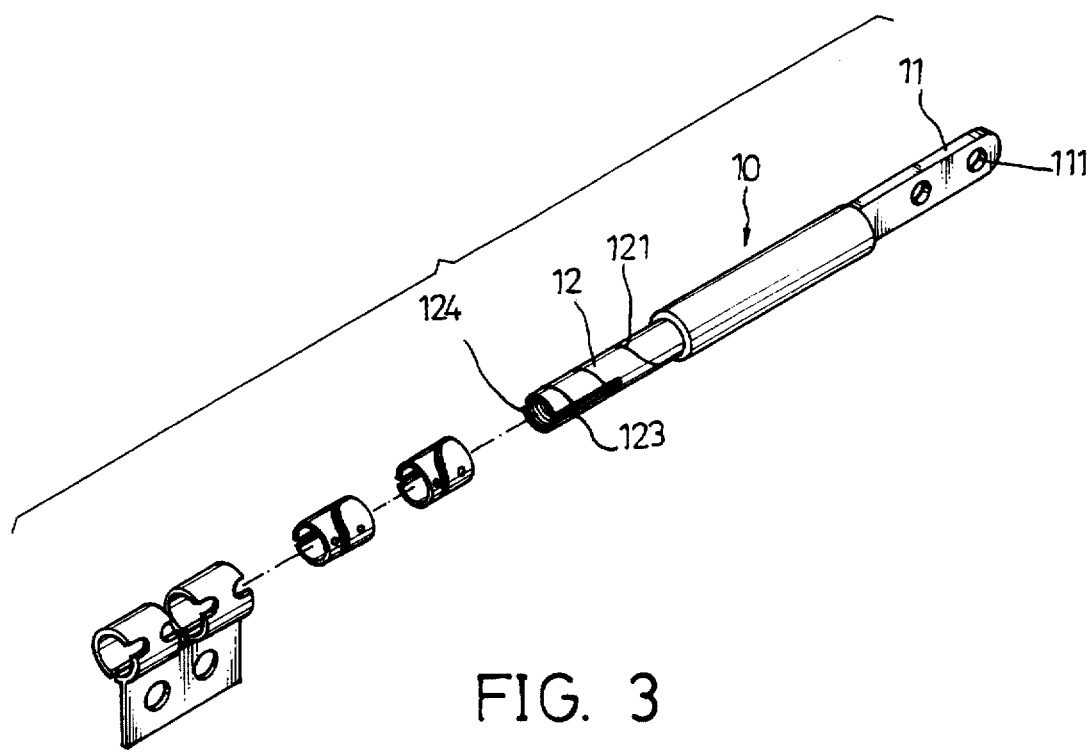
FIG. 3 is an exploded view of another embodiment of a positioning pivot showing that a second portion of a shaft is configured to be hollow and has inner thread formed therein.
Figure 4:
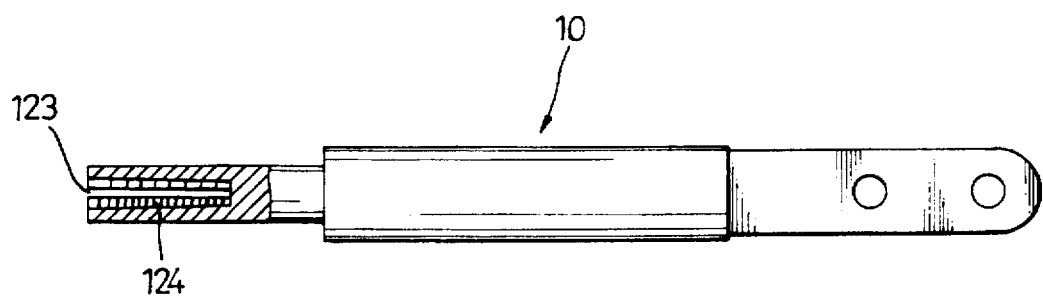
FIG. 4 a partial sectional view of the shaft showing an inner structure of the second portion thereof.
Figure 5:
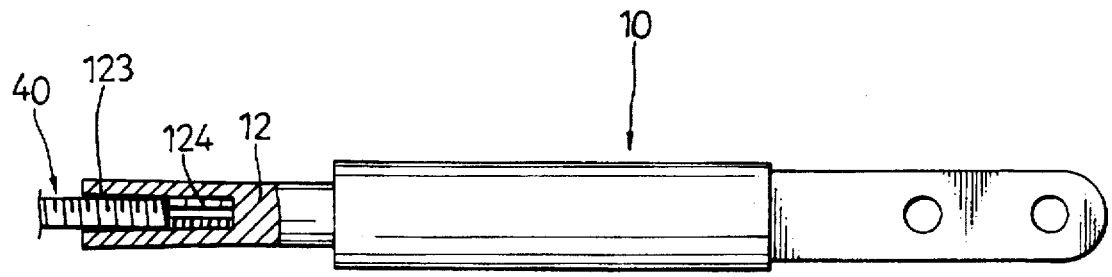
FIG. 5 is a partial sectional view of the shaft showing that an adjusting means is being inserted into the inner structure of the second portion to enlarge the dimension thereof.
Figure 6:
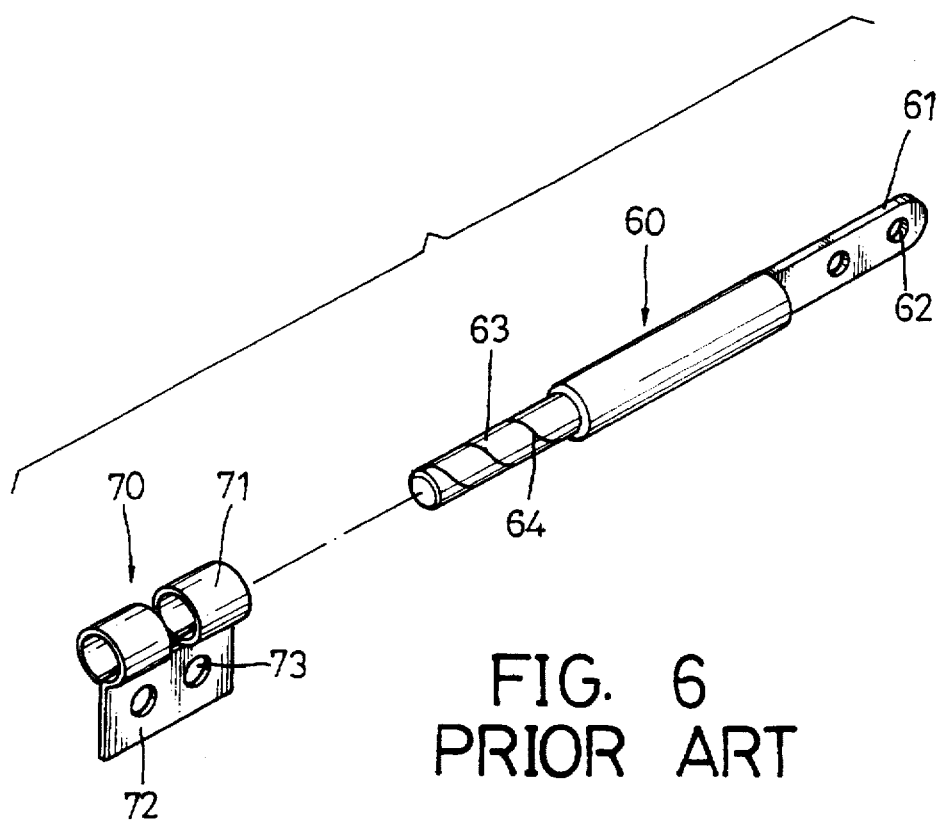
FIG. 6 is an exploded view of a prior positioning pivot.

Referring to FIG. 3 and taking FIG. 4 for reference, the shaft 10 of the positioning pivot may be further configured to have a hollow second portion 12 with an aperture 123 defined from an end to a predetermined distance thereof. The hollow second portion of the shaft 10 has an inner threading 124 defined therein such that even if the relationship between the second portion 12 of the shaft 10 and the sleeve 20 is loosened due to usage over a long period of time and frequent rotation therebetween, a dimension of the second portion 12 of the shaft 10 is able to be enlarged by the insertion of an adjusting means 40 (as seen from FIG. 5) to tightly engage with the sleeve 20 again.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A positioning pivot comprising:
    a shaft having a portion with a groove defined therein;
    at least one sleeve securely enclosing said portion of said shaft and having at least one protrusion formed on an outer periphery thereof; and
    a hinge butt securely enclosing said at least one sleeve and said portion of said shaft therein and having at least one collar with at least one notch defined therein.

2. The positioning pivot as claimed in claim 1, wherein said sleeve further has a slit defined therein and oriented oppositely to an orientation of said groove of said portion of said shaft.

3. The positioning pivot as claimed in claim 1, wherein said protrusion of said sleeve is securely retained by said notch of said collar.

4. The positioning pivot as claimed in claim 1, wherein said portion of said shaft is configured to be hollow and has an inner threading defined therein.

5. The positioning pivot as claimed in claim 4 further comprising an adjusting means which is able to be threadingly inserted into said portion of said shaft for enlarging a dimension of said portion.

6. The positioning pivot as claimed in claim 1, wherein said groove is helical.

7. The positioning pivot as claimed in claim 1, wherein said slit is helical.

* * * * *